US012332944B2

(12) United States Patent
Lin et al.

(10) Patent No.: US 12,332,944 B2
(45) Date of Patent: Jun. 17, 2025

(54) IDENTIFYING EQUIVALENT TECHNICAL TERMS IN DIFFERENT DOCUMENTS

(71) Applicant: International Business Machines Corporation, Armonk, NY (US)

(72) Inventors: June-Ray Lin, Taipei (TW); Nan Chen, Beijing (CN); Ju Ling Liu, Beijing (CN); Li Na Wang, Beijing (CN); Shun Xian Wu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/230,475

(22) Filed: Apr. 14, 2021

(65) Prior Publication Data
US 2022/0335090 A1    Oct. 20, 2022

(51) Int. Cl.
*G06F 16/93*     (2019.01)
*G06F 16/9032*   (2019.01)
(Continued)

(52) U.S. Cl.
CPC ........ *G06F 16/93* (2019.01); *G06F 16/90332* (2019.01); *G06F 16/9035* (2019.01);
(Continued)

(58) Field of Classification Search
CPC ................ G06F 16/93; G06F 16/9038; G06F 16/90332; G06F 16/9035
See application file for complete search history.

(56) References Cited

U.S. PATENT DOCUMENTS 5,642,522 A * 6/1997 Zaenen ................. G06F 40/253
                                                  715/272
9,460,084 B2    10/2016 Mineno
(Continued)

FOREIGN PATENT DOCUMENTS

CN            104063416 A      9/2014

OTHER PUBLICATIONS

Lagutina et al., "An approach to automated thesaurus construction using clusterization-based dictionary analysis", IEEE, 17th conference of Open innovations assocation, pp. 104-105 (Apr. 20, 2015) (Year: 2015).*

(Continued)

*Primary Examiner* — Taelor Kim
(74) *Attorney, Agent, or Firm* — Shackelford, McKinley & Norton, LLP; Robert A. Voigt, Jr.

(57) ABSTRACT

A computer-implemented method, system and computer program product for identifying equivalent technical terms. A deep learning model is trained to identify equivalent technical terms. The deep learning model is then applied to a new document. The sentences of the document are analyzed to identify technical terms. Text is then analyzed surrounding the technical term identified in the document to determine the meaning of such text. A glossary list is then reviewed to determine if the identified meaning of the analyzed text matches a meaning/concept in the glossary list linked to a technical term. In response to determining that the meaning of the analyzed text matches a meaning/concept in the glossary list linked to an equivalent technical term, the technical term in the document is annotated with the equivalent technical term. In this manner, non-standard equivalent technical terms in different documents with the same meaning/concept are able to be identified.

17 Claims, 7 Drawing Sheets

(51) Int. Cl.
*G06F 16/9035* (2019.01)
*G06F 16/9038* (2019.01)
*G06F 18/214* (2023.01)
*G06N 3/08* (2023.01)

(52) U.S. Cl.
CPC ........ *G06F 16/9038* (2019.01); *G06F 18/214* (2023.01); *G06N 3/08* (2013.01)

(56) References Cited

U.S. PATENT DOCUMENTS

| | | |
|---|---|---|
| 9,558,264 B2 | 1/2017 | Visotski et al. |
| 2004/0139400 A1* | 7/2004 | Allam .................. G06F 40/106 715/201 |
| 2007/0073678 A1* | 3/2007 | Scott .................... G06F 16/374 707/999.005 |
| 2013/0198183 A1 | 8/2013 | Clendinning et al. |
| 2015/0294353 A1 | 10/2015 | Schmeling et al. |
| 2015/0339759 A1* | 11/2015 | Pope .................. G06Q 30/0631 705/26.62 |
| 2018/0089300 A1 | 3/2018 | Ahuja et al. |
| 2018/0137137 A1* | 5/2018 | Jin .................... G06F 16/90324 |
| 2019/0228335 A1* | 7/2019 | Suzuki .................. G06N 20/00 |
| 2019/0243893 A1 | 8/2019 | Wahl et al. |
| 2019/0286734 A1* | 9/2019 | Kao .................... G06F 16/2465 |

OTHER PUBLICATIONS

"The Apache Software Foundation—Apache Tomcat 8", Web Application Manager, Version 8.5.100, Mar. 19, 2024, 09 pages.

IBM—"WebSphere Application Server", Administrative Console, Feb. 10, 2025, 15 pages.

Kubernetes, "Ingress", Services, Load Balancing, and Networking, Apr. 22, 2025, 15 pages, https://kubernetes.io/docs/concepts/services-networking/ingress/.

RedHat Documentation, "OpenShift Container Platform", 3.9, Chapter 5. Networking, Apr. 22, 2025, 62 pages.

* cited by examiner

Administrative Console ~601     Web Application Manager ~602 https://www.ibm.com/support/knowledgecenter/SSEQTP_8.5.5/com.ibm.websphere.base.doc/ae/welc6tech_web_adm.html (web application) ~603

Administering web applications:

This page provides a starting point for finding information about web applications, which are comprised of one or more related files that you can manage as a unit, including:
- HTML files
- Servlets can support dynamic web page content, provide database access, serve multiple clients at one time, and filter data.
- Java ServerPages (JSP) files enable the separation of the

604~ (HTML)

HTML code from the business logic in web pages. IBM extensions to the JSP specification make it easy for HTML authors to add the power of Java technology to web pages, without being experts in Java programming. More introduction...

(Administrative console) ~605

You can use the administrative console to deploy

608~ +(web application)

JavaServer Pages (JSP) and JavaServer Faces (JSF) files.

http://tomcat.apache.org/tomcat-8.5-doc/htmlmanager-howto.html#Manager

In many production environments it is very useful to have the capability to manage your web applications without having to shut down and restart Tomcat. This document is for the 606~ (HTML)     (Administrative console) ~611 ~610

HTML web interface to the web application manager.
The interface is divided into six sections:
Message – Displays success and failure messages.
Manager – General manager operations like list and help.
Applications – List of web applications and commands.

(web application) ~607
Deploy – Deploying web applications. ~609
Diagnostics – Identifying potential problems.
Server Information – Information about the Tomcat server.

( ) system annotation
+( ) user annotation

FIG. 6

| MEANINGS/CONCEPTS | PRODUCT A | TECHNICAL TERM OF A | PRODUCT B | TECHNICAL TERM OF B |
|---|---|---|---|---|
| NETWORK ROUTER | OPENSHIFT | ROUTE | KUBERNETES | INGRESS |
| NAME SPACE | OPENSHIFT | PROJECT | KUBERNETES | NAME SPACE |
| UI CONSOLE | OPENSHIFT | WEB CONSOLE | KUBERNETES | DASHBOARD |
| PORT | DOCKER SWARM | PUBLISHED PORT | KUBERNETES | ENDPOINT |
| DEPLOYMENT UNIT | DOCKER SWARM | TASK | KUBERNETES | POD |
| SLAVE | DOCKER SWARM | WORKER | KUBERNETES | NODES |
| CONTROLLER | DOCKER SWARM | MANAGER | KUBERNETES | MASTER |
| UI CONSOLE | WAS | ADMINISTRATIVE CONSOLE | TOMCAT | WEB APPLICATION MANAGER |

FIG. 7

IDENTIFYING EQUIVALENT TECHNICAL TERMS IN DIFFERENT DOCUMENTS

TECHNICAL FIELD

The present disclosure relates generally to term identification systems, and more particularly to identifying equivalent technical terms in different documents using a deep learning model.

BACKGROUND

Technical terms are commonly used in documents, such as technical articles. Such technical terms may or may not be commonly used among those in the technical field. For example, some technical terms may be said to be "standard" in that the use of such terms are commonly accepted in the technical field. For instance, alternating current, capacitor, diode, etc. are commonly understood terms in the field of electrical engineering. There are times, however, when non-standard technical terms are used in documents. Such non-standard technical terms though may not be commonly accepted in the technical field. For example, an "administrative console" in one document could be referred to as a "web management console" in another document despite referring to the same concept or functionality.

When an individual becomes knowledgeable about a product, including the technical terms used to describe that product, it may be difficult for that individual to understand another product even though it may have similar functionality if different technical terms are used to describe the same functionality. As a result, the individual may have difficulty in understanding or using this new but similar product.

SUMMARY

In one embodiment of the present disclosure, a computer-implemented method for identifying equivalent technical terms comprises training a deep learning model to identify equivalent technical terms. The method further comprises applying the deep learning model to a first document. The method additionally comprises analyzing each sentence of the first document to identify technical terms. Furthermore, the method comprises analyzing text surrounding a first technical term identified in the first document to determine a meaning of the text surrounding the first technical term. Additionally, the method comprises reviewing a glossary list to determine if the meaning of the analyzed text surrounding the first technical term in the first document matches a meaning in the glossary list linked to a second technical term, where the glossary list comprises a list of meanings associated with equivalent technical terms in designated products. In addition, the method comprises identifying the second technical term equivalent to the first technical term from the glossary list in response to determining the meaning of the analyzed text surrounding the first technical term matching the meaning in the glossary list linked to the second technical term.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which:

FIG. 6 illustrates an exemplary annotation of technical terms with tags in the text of two separate documents regarding two separate products in accordance with an embodiment of the present disclosure; and FIG. 7 illustrates a glossary list containing a listing of meanings/concepts associated with equivalent technical terms in designated products in accordance with an embodiment of the present disclosure.

DETAILED DESCRIPTION

Figure 1:
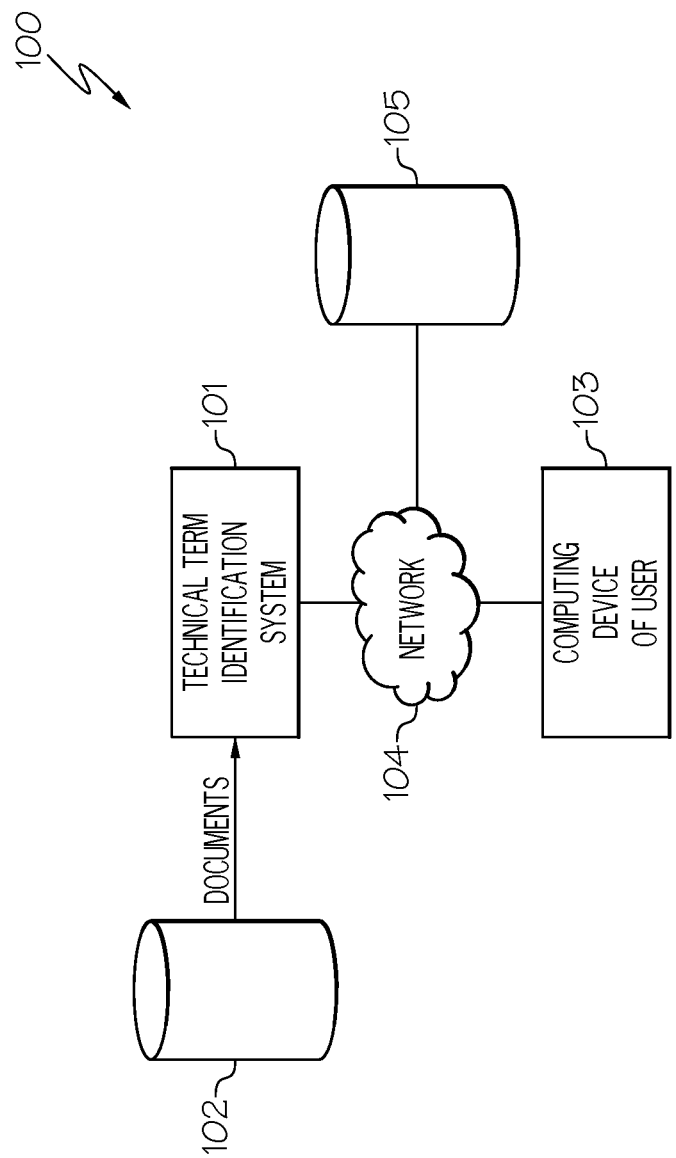
FIG. 1 illustrates a communication system for practicing the principles of the present disclosure in accordance with an embodiment of the present disclosure.

As stated in the Background section, technical terms are commonly used in documents, such as technical articles. Such technical terms may or may not be commonly used among those in the technical field. For example, some technical terms may be said to be "standard" in that the use of such terms are commonly accepted in the technical field. For instance, alternating current, capacitor, diode, etc. are commonly understood terms in the field of electrical engineering. There are times, however, when non-standard technical terms are used in documents. Such non-standard technical terms though may not be commonly accepted in the technical field. For example, an "administrative console" in one document could be referred to as a "web management console" in another document despite referring to the same concept or functionality.

When an individual becomes knowledgeable about a product, including the technical terms used to describe that product, it may be difficult for that individual to understand another product even though it may have similar functionality if different technical terms are used to describe the same functionality. As a result, the individual may have difficulty in understanding or using this new but similar product.

Currently, term identification systems simply identify terms in documents, such as performing a search in a document (e.g., electronic document) for the term entered by a user. In some of these term identification systems, such systems may attempt to identify words with similar meanings as the term entered by the user, such as locating words in the documents that are used in the definition of the term entered by the user.

Unfortunately, term identification systems are unable to identify non-standard technical terms used in different documents (e.g., electronic documents) yet have the same meaning. Such an identification would be helpful to the user in achieving a greater understanding of the technology discussed in the document.

The embodiments of the present disclosure provide a means for identifying non-standard technical terms that have the same meaning (such technical terms are said to be "equivalent") by using a deep learning model trained to identify equivalent technical terms.

In some embodiments of the present disclosure, the present disclosure comprises a computer-implemented method, system and computer program product for identifying equivalent technical terms. In one embodiment of the present disclosure, a deep learning model is trained to identify equivalent technical terms. The deep learning model is then applied to a new document. The sentences of the document are then analyzed to identify technical terms. In one embodiment, natural language processing is used to identify the technical terms by searching the document with terms matching the technical terms listed in a data structure (e.g., list). Text is then analyzed surrounding the technical term identified in the document to determine the meaning of such text. In one embodiment, such meaning may be inferred using part-of-speech tagging or based on a user-designated number of words preceding or succeeding the technical term. A glossary list is then reviewed to determine if the identified meaning of the analyzed text matches a meaning of a concept in the glossary list linked to a technical term. The "glossary list," as used herein, is a list of meanings/concepts associated with equivalent technical terms in designated products. "Equivalent technical terms," as used herein, refer to technical terms having the same semantic meaning within a threshold degree. In response to determining that the meaning of the analyzed text matches a meaning/concept in the glossary list linked to an equivalent technical term, the technical term in the document is annotated with the equivalent technical term. For example, if the meaning of the analyzed text is "UI Console" in connection with the technical term of "Web Console" and the glossary list links or associates such a meaning to the technical term of "Dashboard," then the technical term of "Web Console" may be replaced or tagged with the equivalent term of "Dashboard" so that the user will understand that the non-standard technical term of "Web Console" is the same as the non-standard technical term of "Dashboard." In this manner, non-standard technical terms used in different documents (e.g., technical articles) to describe different products, but have the same meaning/concept, are able to be identified as being equivalent technical terms thereby allowing greater understanding of the documents.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for identifying equivalent technical terms. Communication system 100 includes a system, referred to herein as the technical term identification system 101, configured to identify equivalent technical terms used in documents (e.g., technical articles). Such documents may be stored in a repository 102 and provided to technical term identification system 101 to train a deep learning model to identify equivalent technical terms as discussed further below. After identifying equivalent technical terms, such terms are added to a list, referred to herein as the "glossary list," which is discussed in greater detail further below. In one embodiment, such a list is stored in repository 102.

A discussion regarding the software components used by technical term identification system 101 to identify equivalent technical terms in documents is discussed below in connection with FIG. 2. A description of the hardware configuration of technical term identification system 101 is provided further below in connection with FIG. 3.

System 100 further includes a computing device 103 of a user connected to technical term identification system 101 via a network 104. It is noted that both computing device 103 and the user of computing device 103 may be identified with element number 103.

Computing device 103 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 104 and consequently communicating with technical term identification system 101.

In one embodiment, user 103 may provide technical term identification system 101 with a document (e.g., electronic document) containing technical terms that may need to be annotated with technical terms more familiar to user 103 thereby providing user 103 with a greater understanding of the technology discussed in the document.

Network 104 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

Furthermore, as illustrated in FIG. 1, system 100 includes a repository 105 of electronic documents (e.g., technical articles) publicly accessible to technical term identification system 101 via network 104. Such documents may be used to train a deep learning model to identify equivalent technical terms as discussed further below.

System 100 is not to be limited in scope to any one particular network architecture. System 100 may include any number of technical term identification systems 101, repositories 102, 105, computing devices 103 and networks 104.

Figure 2:
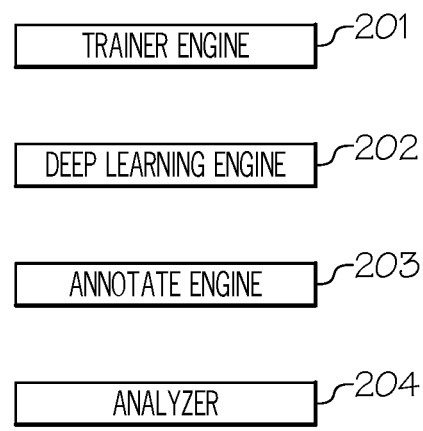
FIG. 2 is a diagram of the software components of the technical term identification system used to identify equivalent technical terms in documents in accordance with an embodiment of the present disclosure.

Referring now to FIG. 2, FIG. 2 is a diagram of the software components of technical term identification system 101 (FIG. 1) used to identify equivalent technical terms in documents in accordance with an embodiment of the present disclosure.

Referring to FIG. 2, in conjunction with FIG. 1, technical term identification system 101 includes a trainer engine 201 configured to gather documents (e.g., electronic documents), such as technical articles, that will be used to train a deep learning engine 202 to identify equivalent technical terms in documents.

In one embodiment, deep learning engine 202 uses a machine learning algorithm (e.g., supervised learning) to build a mathematical model based on sample data consisting of structured and unstructured data (e.g., documents annotated with technical terms that are identified as being equivalent). Such structured and unstructured data may be obtained and tabulated by experts, who in turn, utilize such information to develop the sample data. Such a data set is referred to herein as the "training data" which is used by the machine learning algorithm of deep learning engine 202 to make predictions or decisions without being explicitly programmed to perform the task. The algorithm iteratively makes predictions on the training data and is corrected by the expert until the predictions achieve the desired accuracy. Examples of such supervised learning algorithms include nearest neighbor, Naïve Bayes, decision trees, linear regression, support vector machines and neural networks.

In one embodiment, technical term identification system 101 includes an annotate engine 203 configured to annotate a document by replacing a technical term with an equivalent technical term identified by deep learning engine 202 using a glossary list as discussed further below. In another embodiment, annotate engine 203 is configured to tag a technical term in the document with the equivalent technical term identified by deep learning engine 202 using the glossary list as discussed further below.

In one embodiment, in connection with training the deep learning model to identify equivalent technical terms, annotate engine 203 of technical term identification system 101 is configured to annotate the terms (technical terms) in the text of the documents with tags. A "tag," as used herein, refers to a keyword or term, such as a technical term, placed in the location of the annotated term(s). In one embodiment, such tags of technical terms may be identified from a data structure (table) consisting of a list of technical terms (e.g., web management console, web application, Hypertext Markup Language (HTML)) stored in a storage device (e.g., memory, disk drive) of technical term identification system 101 or in repository 102. In one embodiment, annotate engine 203 is configured to utilize natural language processing to search documents with terms matching the technical terms listed in such a data structure. The technical terms in the analyzed documents are then tagged with the matching technical terms.

In one embodiment, annotate engine 203 is further configured to annotate the tagged technical terms with entity types (e.g., person, organization, code, software component, etc.). In one embodiment, such entity types are previously defined from an expert. In one embodiment, after an expert has established a list of entity types, annotate engine 203 utilizes an entity identification engine (e.g., Statistical Information and Relation Extraction (SIRE) engine available from IBM®) to annotate the tagged technical terms with an entity type. By annotating the tagged technical terms with an entity type, it may assist the deep learning model of technical term identification system 101 in identifying equivalent technical terms. For example, technical terms that are annotated with a different entity type are less likely to be deemed to be equivalent technical terms than if they were annotated with the same entity type.

In one embodiment, the SIRE engine provides components for term or entity detection using maximum entropy models that can be trained from annotated data, a trainable co-reference component for grouping detected terms in a document that correspond to the same entity, and a trainable relation extraction system.

In one embodiment, the entity identification engine, such as the SIRE engine, utilized by annotate engine 203 provides a syntactic breakdown of text in a document, identification of entities detected in the text, co-reference resolution (resolution of two or more terms that refer to the same entity), and relationship detection between entities. In addition, logic is provided for generating search indices augmented with the co-referenced terms discovered by the entity identification engine, and for generating a relational database that stores the entities found by the entity identification engine, the entity type, terms related to the entities, the frequency of the particular relationship within a corpus or across corpora, the time of publication of the document that is the source of the relationship, the corpus identifier, and the document identifier of the document that is the source of the relationship.

In one embodiment, technical term identification system 101 includes an analyzer 204 configured to analyze each sentence of the document to identify the technical term(s), if any. In one embodiment, analyzer 204 is configured to utilize natural language processing to search documents with terms matching the technical terms listed in a data structure (e.g., table). If any technical terms listed in the data structure are identified, then such technical terms are identified in the document, such as being tagged as a technical term. In one embodiment, such a data structure is stored in a storage device (e.g., memory, disk drive) of technical term identification system 101 or in repository 102.

In one embodiment, analyzer 204 is further configured to analyze text surrounding the identified technical terms in the documents to determine the meaning of such text. In one embodiment, analyzer 204 utilizes natural language processing to identify the meaning in terms of concepts associated with such technical terms. A "concept," as used herein, refers to an idea or a general notion, such as a deploying web applications. In one embodiment, when the technical term corresponds to a noun, analyzer 204 identifies such concepts based on identifying the technical term-verb-noun pattern using part-of-speech tagging. For example, if the technical term is "web application manager" and the corresponding verb is "deploying" followed by the noun of "web applications," then the pattern of "web application manager deploying web applications" is identified. The concept of deploying web applications may then be inferred based on the verb-noun pattern describing the technical term.

In one embodiment, part-of-speech tagging is accomplished using a rule-based (e.g., E. Brill's tagger) or a stochastic part-of-speech tagging algorithm (e.g., Hidden Markov Model (HMM)).

In one embodiment, the meaning of a technical term may be inferred based on a user-designated number of words preceding or succeeding the technical term. Such words may be associated with the technical term and stored in a data structure (e.g., table), which is stored in a storage device (e.g., memory, disk drive) of technical term identification system 101 or in repository 102. For example, in the sentence "A capacitor is a device that stores electrical energy in an electric field.," the words "is a device that stores electrical energy" may be identified as succeeding the technical term of "capacitor." Such words that are nearby the technical term may provide the meaning of the technical term, such as a capacitor is a device that stores electrical energy. Such a meaning may also correspond to the "concept" of the technical term. In one embodiment, such meanings or concepts are stored in a data structure (e.g., table), referred to herein as the "glossary list," that stores a listing of concepts/meanings and the associated technical terms. In one embodiment, the data structure is stored in a storage device (e.g., memory, disk drive) of technical term identification system 101 or in repository 102.

A further description of these and other functions is provided below in connection with the discussion of the method for identifying equivalent technical terms in documents.

Prior to the discussion of the method for identifying equivalent technical terms in documents, a description of the hardware configuration of technical term identification system 101 (FIG. 1) is provided below in connection with FIG. 3.

Figure 3:
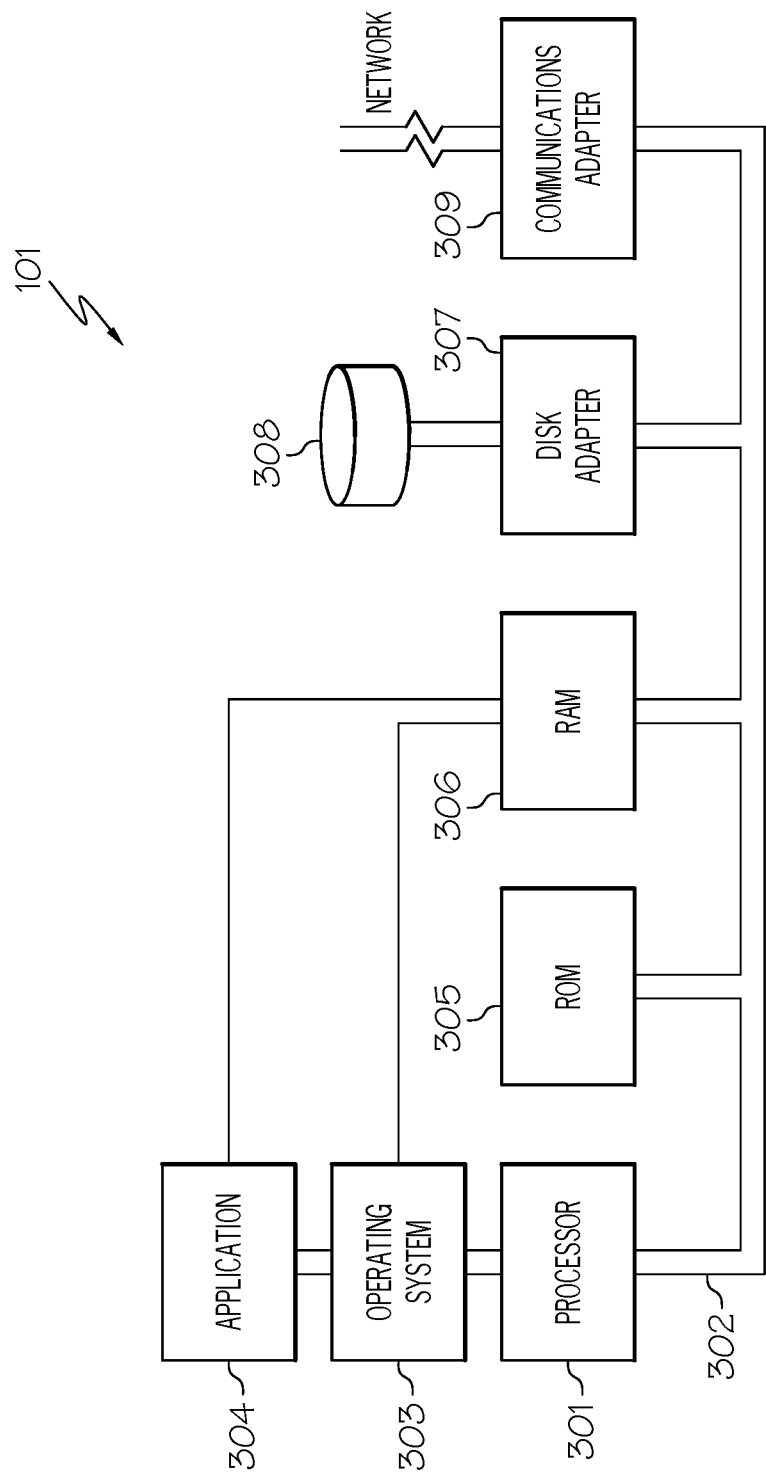
FIG. 3 illustrates an embodiment of the present disclosure of the hardware configuration of the technical term identification system which is representative of a hardware environment for practicing the present disclosure.

Referring now to FIG. 3, FIG. 3 illustrates an embodiment of the present disclosure of the hardware configuration of technical term identification system 101 (FIG. 1) which is representative of a hardware environment for practicing the present disclosure.

Technical term identification system 101 has a processor 301 connected to various other components by system bus 302. An operating system 303 runs on processor 301 and provides control and coordinates the functions of the various components of FIG. 3. An application 304 in accordance with the principles of the present disclosure runs in conjunction with operating system 303 and provides calls to operating system 303 where the calls implement the various functions or services to be performed by application 304. Application 304 may include, for example, trainer engine 201 (FIG. 2), deep learning engine 202 (FIG. 2), annotate engine 203 (FIG. 2) and analyzer 204 (FIG. 2). Furthermore, application 304 may include, for example, a program for identifying equivalent technical terms in documents as discussed further below in connection with FIGS. 4-7.

Referring again to FIG. 3, read-only memory ("ROM") 305 is connected to system bus 302 and includes a basic input/output system ("BIOS") that controls certain basic functions of technical term identification system 101. Random access memory ("RAM") 306 and disk adapter 307 are also connected to system bus 302. It should be noted that software components including operating system 303 and application 304 may be loaded into RAM 306, which may be technical term identification system's 101 main memory for execution. Disk adapter 307 may be an integrated drive electronics ("IDE") adapter that communicates with a disk unit 308, e.g., disk drive. It is noted that the program for identifying equivalent technical terms in documents, as discussed further below in connection with FIGS. 4-7, may reside in disk unit 308 or in application 304.

Technical term identification system 101 may further include a communications adapter 309 connected to bus 302. Communications adapter 309 interconnects bus 302 with an outside network (e.g., network 104 of FIG. 1) to communicate with other devices, such as computing device 103 (FIG. 1), repository 105 (FIG. 1).

In one embodiment, application 304 of technical term identification system 101 includes the software components of trainer engine 201, deep learning engine 202, annotate engine 203 and analyzer 204. In one embodiment, such components may be implemented in hardware, where such hardware components would be connected to bus 302. The functions discussed above performed by such components are not generic computer functions. As a result, technical term identification system 101 is a particular machine that is the result of implementing specific, non-generic computer functions.

In one embodiment, the functionality of such software components (e.g., trainer engine 201, deep learning engine 202, annotate engine 203 and analyzer 204) of technical term identification system 101, including the functionality for identifying equivalent technical terms in documents, may be embodied in an application specific integrated circuit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, technical terms are commonly used in documents, such as technical articles. Such technical terms may or may not be commonly used among those in the technical field. For example, some technical terms may be said to be "standard" in that the use of such terms are commonly accepted in the technical field. For instance, alternating current, capacitor, diode, etc. are commonly understood terms in the field of electrical engineering. There are times, however, when non-standard technical terms are used in documents. Such non-standard technical terms may not be commonly accepted terms used in the technical field. For example, an "administrative console" in one document could be referred to as a "web management console" in another document despite referring to the same concept or functionality. When an individual becomes knowledgeable about a product, including the technical terms used to describe that product, it may be difficult for that individual to understand another product even though it may have similar functionality if different technical terms are used to describe the same functionality. As a result, the individual may have difficulty in understanding or using this new but similar product. Currently, term identification systems simply identify terms in documents, such as performing a search in a document (e.g., electronic document) for the term entered by a user. In some of these term identification systems, such systems may attempt to identify words with similar meanings as the term entered by the user, such as locating words in the documents that are used in the definition of the term entered by the user. Unfortunately, term identification systems are unable to identify non-standard technical terms used in different documents (e.g., electronic documents) yet have the same meaning. Such an identification would be helpful to the user in achieving a greater understanding of the technology discussed in the document.

Figure 4:
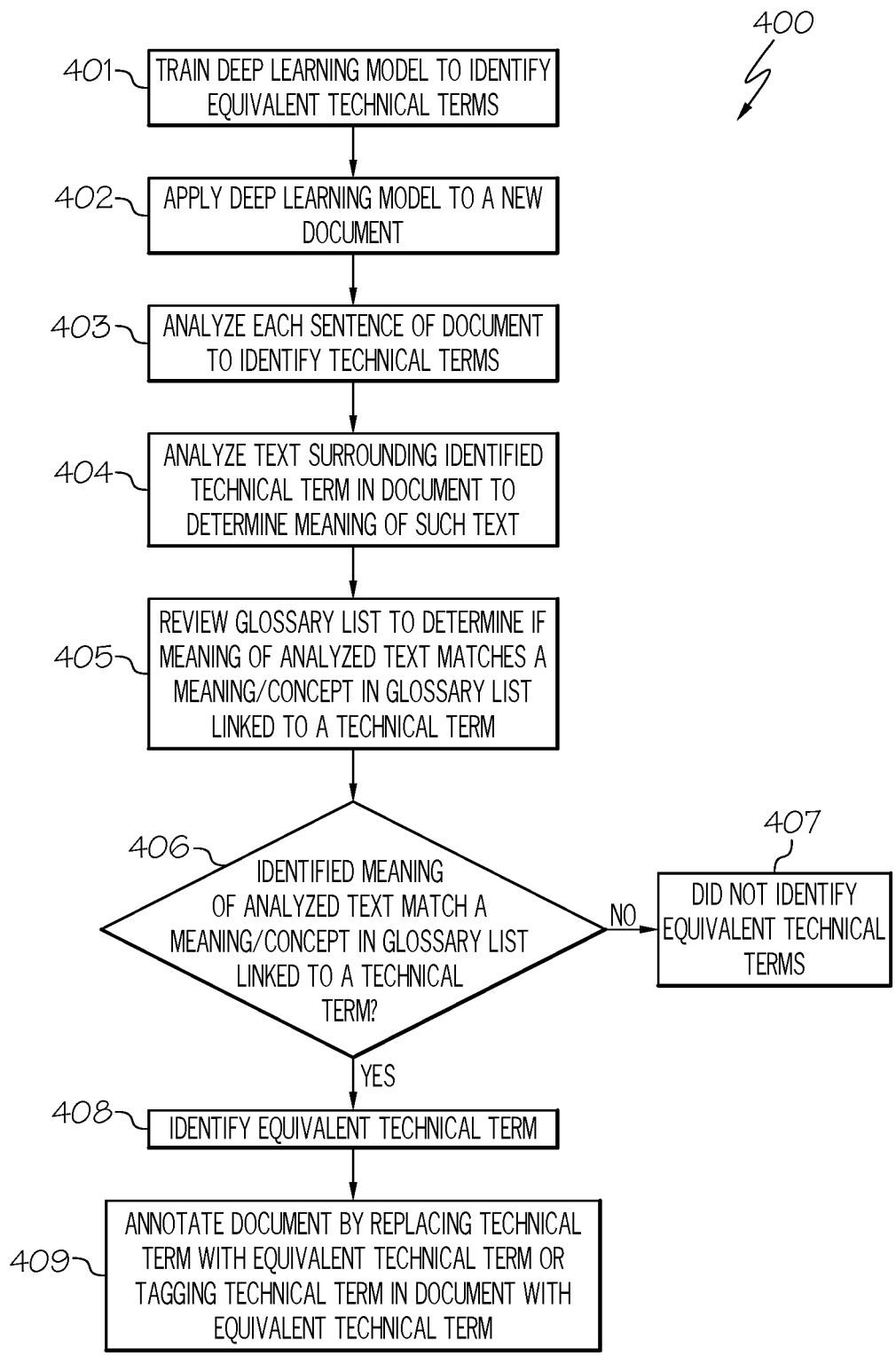
FIG. 4 is a flowchart of a method for identifying equivalent technical terms in documents in accordance with an embodiment of the present disclosure.
Figure 5:
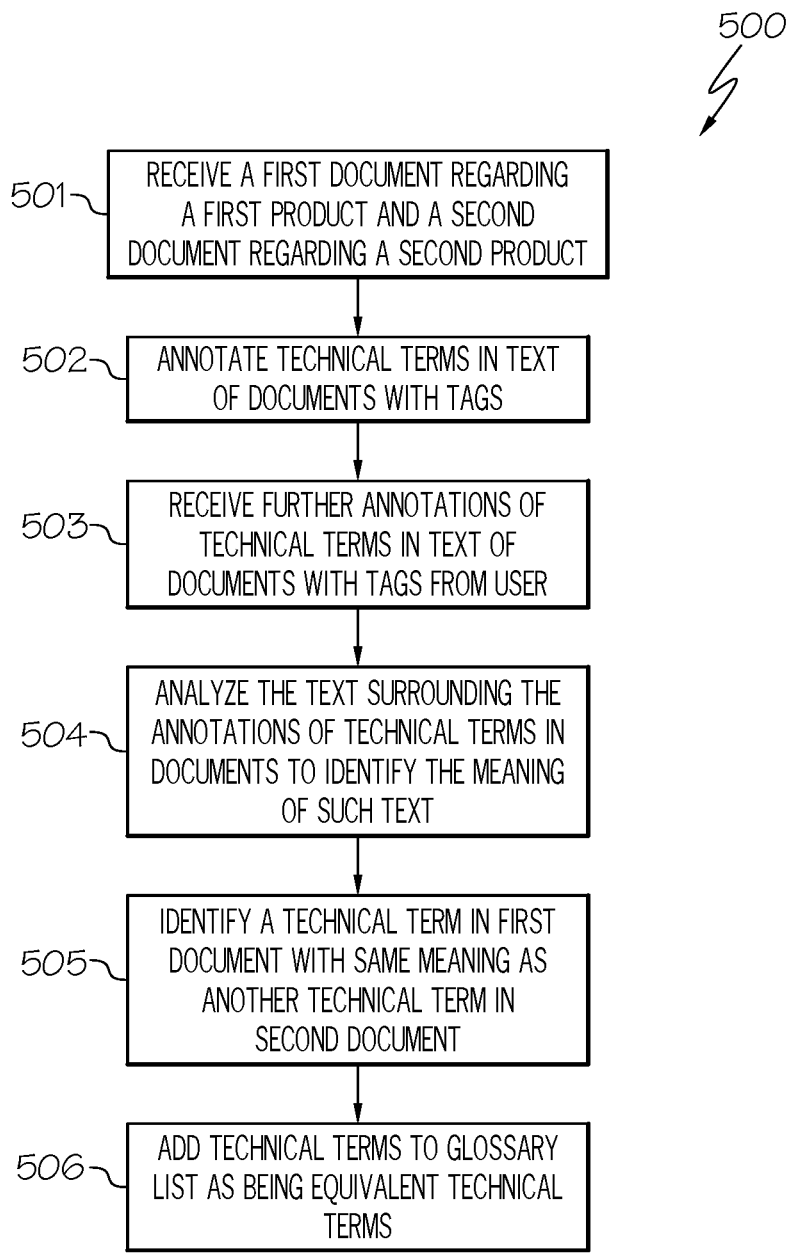
FIG. 5 is a flowchart of a method for training a deep learning model to identify equivalent technical terms in accordance with an embodiment of the present disclosure.

The embodiments of the present disclosure provide a means for identifying non-standard technical terms that have the same meaning (such technical terms are said to be "equivalent") by using a deep learning model trained to identify equivalent technical terms as discussed below in connection with FIGS. 4-7. FIG. 4 is a flowchart of a method for identifying equivalent technical terms in documents. FIG. 5 is a flowchart of a method for training a deep learning model to identify equivalent technical terms. FIG. 6 illustrates an exemplary annotation of technical terms with tags in the text of two separate documents regarding two separate products. FIG. 7 illustrates a glossary list containing a listing of meanings/concepts associated with equivalent technical terms in designated products.

As discussed above, FIG. 4 is a flowchart of a method 400 for identifying equivalent technical terms in documents in accordance with an embodiment of the present disclosure.

Referring to FIG. 4, in conjunction with FIGS. 1-3, in step 401, a deep learning model is trained to identify equivalent technical terms as discussed below in connection with FIG. 5.

FIG. 5 is a flowchart of a method 500 for training a deep learning model to identify equivalent technical terms in accordance with an embodiment of the present disclosure.

Referring to FIG. 5, in conjunction with FIGS. 1-4, in step 501, deep learning engine 202 of technical term identification system 101 receives a first document regarding a first product (e.g., administrative console) and a second document regarding a second product (e.g., web application manager). In one embodiment, trainer engine 201 gathers and provides such documents (e.g., electronic documents), which may be technical documents, to deep learning engine 202 to train the deep learning model.

In one embodiment, trainer engine 201 collects or gathers documents (e.g., electronic documents), such as technical articles, from repository 102 as well as documents that are publicly available on the Internet, such as accessing such documents in repository 105 via network 104. In one embodiment, such documents used for training purposes are populated in repository 102 by an expert. Such documents may then be provided to technical term identification system 101 for training purposes.

In step 502, annotate engine 203 of technical term identification system 101 annotates terms (technical terms) in the text of the documents with tags. A "tag," as used herein, refers to a keyword or term, such as a technical term, placed in the location of the annotated term(s). As discussed above, in one embodiment, such tags of technical terms may be identified from a data structure (table) consisting of a list of technical terms (e.g., web management console, web application, Hypertext Markup Language (HTML)) stored in a storage device (e.g., memory, disk drive) of technical term identification system 101 or in repository 102. In one embodiment, annotate engine 203 is configured to utilize natural language processing to search documents with terms matching the technical terms listed in such a data structure. The technical terms in the analyzed documents are then tagged with the matching technical terms.

In one embodiment, annotate engine 203 further annotates the tagged technical terms with entity types (e.g., person, organization, code, software component, etc.). In one embodiment, such entity types are previously defined from an expert. In one embodiment, after an expert has established a list of entity types, annotate engine 203 utilizes an entity identification engine (e.g., Statistical Information and Relation Extraction (SIRE) engine available from IBM®) to annotate the tagged technical terms with an entity type. By annotating the tagged technical terms with an entity type, it may assist the deep learning model of technical term identification system 101 in identifying equivalent technical terms. For example, technical terms that are annotated with a different entity type are less likely to be deemed to be equivalent technical terms than if they were annotated with the same entity type.

In one embodiment, the SIRE engine provides components for term or entity detection using maximum entropy models that can be trained from annotated data, a trainable co-reference component for grouping detected terms in a document that correspond to the same entity, and a trainable relation extraction system.

In one embodiment, the entity identification engine, such as the SIRE engine, utilized by annotate engine 203 provides a syntactic breakdown of text in a document, identification of entities detected in the text, co-reference resolution (resolution of two or more terms that refer to the same entity), and relationship detection between entities. In addition, logic is provided for generating search indices augmented with the co-referenced terms discovered by the entity identification engine, and for generating a relational database that stores the entities found by the entity identification engine, the entity type, terms related to the entities, the frequency of the particular relationship within a corpus or across corpora, the time of publication of the document that is the source of the relationship, the corpus identifier, and the document identifier of the document that is the source of the relationship.

An example of annotate engine 203 annotating the technical terms in the text of the documents with tags is shown in FIG. 6.

FIG. 6 illustrates an exemplary annotation of technical terms with tags in the text of two separate documents regarding two separate products in accordance with an embodiment of the present disclosure.

Referring to FIG. 6, FIG. 6 illustrates a first document 601 regarding the product of an administrative console and a second document 602 regarding the product of a web application manager. As shown in FIG. 6, annotate engine 203 annotates document 601 by annotating the technical terms of "web application," "HTML," and "administrative console," with tags of web application 603, HTML 604, and administrative console 605, respectively. Furthermore, as shown in FIG. 6, annotate engine 203 annotates document 602 by annotating the technical terms of "HTML" and "web application," with tags of HTML 606 and web application 607, respectively.

As previously discussed, such tags of technical terms may be identified from a data structure (table) consisting of a list of technical terms. In one embodiment, annotate engine 203 utilizes natural language processing to search documents (601, 602) with terms matching the technical terms listed in such a data structure. Such matching terms are tagged with the matching technical term, such as tags 603, 604, 605, 606 and 607.

Returning to FIG. 5, in conjunction with FIGS. 1-4 and 6, in step 503, technical term identification system 101 receives further annotations of technical terms in the text of documents with tags from a user, such as the user of computing device 103.

In one embodiment, the user of computing device 103 may obtain access of the documents (e.g., documents 601, 602) from technical term identification system 101 and annotate the documents using a software tool, such as ClickUp®, Filestage®, Prodigy®, Annotate, PDF Annotator®, Drawboard® Projects, Doccano, Ink2Go, etc.

Such annotations may be provided to technical term identification system 101 by the user of computing device 103 via network 104, such as shown in FIG. 6.

Referring to FIG. 6, the technical term of "JavaServer Pages (JSP)" was annotated by the user of computing device 103 with the tag of "web application" 608 to indicate that the sentence in which such a term was used could have also stated "web application" as opposed to "JavaServer Pages (JSP)." As a result, the user of computing device 103 is indicating that the administrative console of document 601 is used to develop a web application.

Returning to FIG. 5, in conjunction with FIGS. 1-4 and 6, in step 504, analyzer 204 of technical term identification system 101 analyzes the text surrounding the annotations of technical terms in the documents to identify the meaning of such text.

As discussed above, in one embodiment, analyzer 204 utilizes natural language processing to identify the meaning in terms of concepts associated with such technical terms. A "concept," as used herein, refers to an idea or a general notion, such as a deploying web applications. In one embodiment, when the technical term corresponds to a noun, analyzer 204 identifies such concepts based on identifying the technical term-verb-noun pattern using part-of-speech tagging. For example, if the technical term is "web application manager" and the corresponding verb is "deploying" followed by the noun of "web applications," then the pattern of "web application manager deploying web applications" is identified. The concept of deploying web applications may then be inferred based on the verb-noun pattern describing the technical term.

In one embodiment, part-of-speech tagging is accomplished using a rule-based (e.g., E. Brill's tagger) or a stochastic part-of-speech tagging algorithm (e.g., Hidden Markov Model (HMM)).

In one embodiment, the meaning of a technical term may be inferred based on a user-designated number of words preceding or succeeding the technical term. Such words may be associated with the technical term and stored in a data structure (e.g., table), which is stored in a storage device (e.g., memory, disk drive) of technical term identification system 101 or in repository 102. For example, in the sentence "A capacitor is a device that stores electrical energy in an electric field.," the words "is a device that stores electrical energy" may be identified as succeeding the technical term of "capacitor." Such words that are nearby the technical term may provide the meaning of the technical term, such as a capacitor is a device that stores electrical energy. Such a meaning may also correspond to the "concept" of the technical term. In one embodiment, such meanings or concepts are stored in a data structure (e.g., table), referred to herein as the "glossary list," that stores a listing of concepts/meanings and the associated technical terms. In one embodiment, the data structure is stored in a storage device (e.g., memory, disk drive) of technical term identification system 101 or in repository 102.

In step 505, analyzer 204 of technical term identification system 101 identifies a technical term in the first document (e.g., document 601) with a same meaning as another technical term in the second document (e.g., document 602).

In one embodiment, the technical term in the first document is deemed to have the same meaning as another technical term in the second document when the meaning of the analyzed text surrounding the technical term in the first document has a semantic similarity to the meaning of the analyzed text surrounding the technical term in the second document that exceeds a threshold value.

As discussed above, a "glossary list" may store technical terms and their associated meanings/concepts. For example, referring to FIG. 6, in connection with document 601, the technical term of administrative console 605 is associated with the meaning of "deploy web application," which may be identified using part-of-speech tagging using the pattern of technical term-verb-noun. In another example, such a meaning is identified by identifying the words (e.g., four words) following the technical term. As a result, the technical term of "administrative console" and the meaning/concept of "deploy web application" may be stored in the glossary list.

Continuing to refer to FIG. 6, analyzer 204 further analyzes document 602 to determine if the meaning/concept of "deploy web application" is discussed in document 602 as well. As shown in FIG. 6, the concept of deploy, specifically deploying web applications is also taught (see element 609) in document 602. In one embodiment, as previously discussed, analyzer 204 utilizes natural language processing to identify the same or similar language, such as identifying the term "deploy" within a user-designated number of words to the term "web application." In one embodiment, analyzer 204 utilizes natural language processing to determine if the part-of-speech pattern of verb-noun of the meaning/concept of a technical term is found within the other document. In one embodiment, analyzer 204 utilizes natural language processing for matching tags in both references (e.g., tag 604 in document 601 matches tag 606 in document 602, tags 603, 608 in document 601 match tag 607 in document 602) to be used in assisting to determine whether there is a matching meaning/concept of a technical term.

Upon identifying the same meaning/concept being expressed in the other document (e.g., document 602), analyzer 204 analyzes the text of the second document for the technical term, which may be a non-standard technical term, that is associated with the matching meaning/concept. Such a technical term may be found using natural language processing by identifying the subject of the paragraph containing the matching meaning/concept. For example, referring to the FIG. 6, the subject of the paragraph containing the matching meaning/concept 609 is web application manager 610, which is the title of the article. In one embodiment, the subject of the paragraph may be determined by analyzer 204 using natural language processing to identify the noun or subject in the title or in a user-designated number of sentences beginning the paragraph containing the matching meaning/concept.

As shown in FIG. 6, the title of document 602 includes the technical term of web application manager. Furthermore, as shown in FIG. 6, the technical term of web application manager is used in connection with the features of the web application manager listed via bullet points.

By identifying matching meanings in documents 601, 602, analyzer 204 is able to determine that the technical term of administrative control 605 corresponds to the technical term of web application manager 610. As a result, in one embodiment, annotate engine 203 annotates document 602 by including the tag of administrative console 611 with the technical term of web application manager 610 to indicate that they are equivalent technical terms.

In step 506, technical term identification system 101 adds the equivalent terms to the glossary list, including the documents or the products discussed in the documents, as well as the meaning/concept. The "glossary list," as used herein, is a list of meanings/concepts associated with equivalent technical terms in designated products. "Equivalent technical terms," as used herein, refer to technical terms having the same semantic meaning within a threshold degree.

The deep learning model continues to be trained until an expert determines that the results are satisfactory, such as automatically identifying equivalent terms using the glossary list without having a user to provide annotations to the technical terms in order to identify equivalent technical terms. For instance, referring to the above example, after analyzer 204 determines that the meaning of "administrative console" in document 601 matches the meaning of "web application manager" in document 602, and such terms were previously identified as being equivalent technical terms in the glossary list, then the deep learning model would simply annotate such terms as being equivalent technical terms (e.g., annotate "administrative console" with the tag of "web application manager" in document 601 and annotate "web application manager" with the tag of "administrative console" in document 602) without having to add such terms to the glossary list.

An exemplary glossary list as a result of training the deep learning model is shown in FIG. 7.

FIG. 7 illustrates a glossary list containing a listing of meanings/concepts associated with equivalent technical terms in designated products in accordance with an embodiment of the present disclosure.

As shown in FIG. 7, for each row, glossary list 700 includes a listing of the meanings/concepts 701 followed by a listing of products 702 followed by the technical terms 703 of product 702 with the corresponding meaning/concept for that row followed by a listing of different products 704 followed by the technical terms 705 of product 704 with the corresponding meaning/concept for that row. For example, the technical term of "Route" used in the Product "OpenShift" and the technical term of "Ingress" used in the Product "Kubernetes" both have the same meaning/concept of "Network Router." In another example, the technical term of "Project" used in the Product "OpenShift" and the technical term of "Name Space" used in the Product "Kubernetes" both have the same meaning/concept of "Name Space."

Returning now to FIG. 4, in conjunction with FIGS. 1-3 and 5-7, in step 402, technical term identification system 101 applies the dep learning model to a new document, such as an electronic document provided to technical term identification system 101. In one embodiment, such a document may be provided to technical term identification system 101 by the user of computing device 103. The following steps are performed using the deep learning model to identify any equivalent technical terms in the document.

In step 403, analyzer 204 of technical term identification system 101 analyzes each sentence of the document to identify any technical terms. As previously discussed, in one embodiment, analyzer 204 is configured to utilize natural language processing to search documents with terms matching the technical terms listed in a data structure (e.g., list containing a listing of technical terms). If any technical terms listed in the data structure are identified, then such technical terms are identified in the document, such as being tagged as a technical term. In one embodiment, such a data structure is stored in a storage device (e.g., memory, disk drive) of technical term identification system 101 or in repository 102.

In step 404, analyzer 204 of technical term identification system 101 analyzes the text surrounding the identified technical term in the document to determine the meaning of such text. As discussed above, in one embodiment, analyzer 204 is configured to utilize natural language processing to search documents with terms matching the technical terms listed in a data structure (e.g., list containing a listing of technical terms). If any technical terms listed in the data structure are identified, then such technical terms are identified in the document, such as being tagged as a technical term. In one embodiment, such a data structure is stored in a storage device (e.g., memory, disk drive) of technical term identification system 101 or in repository 102.

In one embodiment, analyzer 204 is further configured to analyze text surrounding the identified technical terms in the documents to determine the meaning of such text. In one embodiment, analyzer 204 utilizes natural language processing to identify the meaning in terms of concepts associated with such technical terms. A "concept," as used herein, refers to an idea or a general notion, such as a deploying web applications. In one embodiment, when the technical term corresponds to a noun, analyzer 204 identifies such concepts based on identifying the technical term-verb-noun pattern using part-of-speech tagging. For example, if the technical term is "web application manager" and the corresponding verb is "deploying" followed by the noun of "web applications," then the pattern of "web application manager deploying web applications" is identified. The concept of deploying web applications may then be inferred based on the verb-noun pattern describing the technical term.

In one embodiment, part-of-speech tagging is accomplished using a rule-based (e.g., E. Brill's tagger) or a stochastic part-of-speech tagging algorithm (e.g., Hidden Markov Model (HMM)).

In one embodiment, the meaning of a technical term may be inferred based on a user-designated number of words preceding or succeeding the technical term. Such words may be associated with the technical term and stored in a data structure (e.g., table), which is stored in a storage device (e.g., memory, disk drive) of technical term identification system 101 or in repository 102. For example, in the sentence "A capacitor is a device that stores electrical energy in an electric field.," the words "is a device that stores electrical energy" may be identified as succeeding the technical term of "capacitor." Such words that are nearby the technical term may provide the meaning of the technical term, such as a capacitor is a device that stores electrical energy. Such a meaning may also correspond to the "concept" of the technical term. In one embodiment, such meanings or concepts are stored in a data structure (e.g., table), referred to herein as the "glossary list," that stores a listing of concepts/meanings and the associated technical terms. In one embodiment, the data structure is stored in a storage device (e.g., memory, disk drive) of technical term identification system 101 or in repository 102.

In step 405, technical term identification system 101 (deep learning model of technical term identification system 101) reviews glossary list 700 to determine if the meaning of the analyzed text matches a meaning/concept in glossary list 700 linked to a technical term. For example, if the meaning of the analyzed text is "UI Console," then technical term identification system 101 may identify such meaning/concept in glossary list 700 that is linked or associated with the technical terms of "Web Console" or "Dashboard." If the technical term of "Web Console" is used in the document being reviewed, then the technical term of "Web Console" may be replaced or tagged with the equivalent term of "Dashboard" so that the user will understand that the non-standard technical term of "Web Console" is the same as the non-standard technical term of "Dashboard."

In one embodiment, the meaning of the analyzed text surrounding the technical term in the analyzed document is deemed to match a meaning/concept in glossary list 700 when the meaning of the analyzed text surrounding the technical term has a semantic similarity to a meaning in glossary list 700 that exceeds a threshold value, which may be user-specified.

In step 406, technical term identification system 101 (deep learning model of technical term identification system 101) determines whether there is a match of the identified meaning of the analyzed text with a meaning/concept in glossary list 700 linked to a technical term.

If there was not a match of the identified meaning of the analyzed text with a meaning/concept in glossary list 700 linked to a technical term, then, in step 407, technical term identification system 101 (deep learning model of technical term identification system 101) did not identify equivalent technical terms.

If, however, there was a match of the identified meaning of the analyzed text with a meaning/concept in glossary list 700 linked to a technical term, then, in step 408, technical term identification system 101 (deep learning model of technical term identification system 101) identifies equivalent technical terms.

In step 409, annotate engine 203 of technical term identification system 101 annotates the document, such as by replacing the technical term in the document with the equivalent technical term found in glossary list 700 or tagging the technical term in the document with the equivalent technical term found in glossary list 700.

In this manner, the principles of the present disclosure enable term identification systems to identify non-standard technical terms that have the same meaning as other non-standard technical terms being used in a document using a deep learning model trained to identify equivalent technical terms. Consequently, technical terms used in a document may be replaced or tagged with equivalent technical terms that may be more familiar to the reviewer of the document.

As a result, a user, such as a technical user, will be able to understand and master another product by reviewing the description of that product with technical terms familiar to that technical user. Furthermore, such a technical user will be able to more quickly troubleshoot issues since the document used to troubleshoot issues will contain terms familiar to that technical user. Additionally, the technical user will be able to more effectively compare products since the user will obtain a better understanding of the products due to the documents describing such products containing technical terms that may be more familiar to the user. Furthermore, by identifying equivalent technical terms, the product architecture and technical systems will be better understood resulting in making more informed business decisions.

Furthermore, the present disclosure improves the technology or technical field involving term identification systems. As discussed above, technical terms are commonly used in documents, such as technical articles. Such technical terms may or may not be commonly used among those in the technical field. For example, some technical terms may be said to be "standard" in that the use of such terms are commonly accepted in the technical field. For instance, alternating current, capacitor, diode, etc. are commonly understood terms in the field of electrical engineering. There are times, however, when non-standard technical terms are used in documents. Such non-standard technical terms though may not be commonly accepted in the technical field. For example, an "administrative console" in one document could be referred to as a "web management console" in another document despite referring to the same concept or functionality. When an individual becomes knowledgeable about a product, including the technical terms used to describe that product, it may be difficult for that individual to understand another product even though it may have similar functionality if different technical terms are used to describe the same functionality. As a result, the individual may have difficulty in understanding or using this new but similar product. Currently, term identification systems simply identify terms in documents, such as performing a search in a document (e.g., electronic document) for the term entered by a user. In some of these term identification systems, such systems may attempt to identify words with similar meanings as the term entered by the user, such as locating words in the documents that are used in the definition of the term entered by the user. Unfortunately, term identification systems are unable to identify non-standard technical terms used in different documents (e.g., electronic documents) yet have the same meaning. Such an identification would be helpful to the user in achieving a greater understanding of the technology discussed in the document.

Embodiments of the present disclosure improve such technology by training a deep learning model to identify equivalent technical terms. The deep learning model is then applied to a new document. The sentences of the document are then analyzed to identify technical terms. In one embodiment, natural language processing is used to identify the technical terms by searching the document with terms matching the technical terms listed in a data structure (e.g., list). Text is then analyzed surrounding the technical term identified in the document to determine the meaning of such text. In one embodiment, such meaning may be inferred using part-of-speech tagging or based on a user-designated number of words preceding or succeeding the technical term. A glossary list is then reviewed to determine if the identified meaning of the analyzed text matches a meaning of a concept in the glossary list linked to a technical term. The "glossary list," as used herein, is a list of meanings/concepts associated with equivalent technical terms in designated products. "Equivalent technical terms," as used herein, refer to technical terms having the same semantic meaning within a threshold degree. In response to determining that the meaning of the analyzed text matches a meaning/concept in the glossary list linked to an equivalent technical term, the technical term in the document is annotated with the equivalent technical term. For example, if the meaning of the analyzed text is "UI Console" in connection with the technical term of "Web Console" and the glossary list links or associates such a meaning to the technical term of "Dashboard," then the technical term of "Web Console" may be replaced or tagged with the equivalent term of "Dashboard" so that the user will understand that the non-standard technical term of "Web Console" is the same as the non-standard technical term of "Dashboard." In this manner, non-standard technical terms used in different documents (e.g., technical articles) to describe different products, but have the same meaning/concept, are able to be identified as being equivalent technical terms thereby allowing greater understanding of the documents. Furthermore, in this manner, there is an improvement in the technical field involving term identification systems.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for identifying equivalent technical terms, the method comprising:

training a deep learning model to identify equivalent technical terms using training data comprising structured and unstructured data comprising documents annotated with technical terms that are identified as being equivalent, wherein said equivalent technical terms correspond to technical terms having a same semantic meaning within a threshold degree, wherein said training of said deep learning model to identify equivalent technical terms comprises:

annotating technical terms in text of a first document regarding a first product and a second document regarding a second product with tags corresponding to matching technical terms listed in a data structure; and annotating said tagged technical terms with entity types using an entity identification engine to assist said deep learning model in identifying equivalent technical terms, wherein said entity identification engine provides components for term or entity detection using maximum entropy models trained from annotated data, wherein said entity identification engine further provides a trainable co-reference component for grouping detected terms in a document that correspond to a same entity, and a trainable relation extraction system;

applying said deep learning model to a first document;

analyzing each sentence of said first document to identify technical terms;

analyzing text preceding or succeeding a first technical term identified in said first document to determine a meaning of said text preceding or succeeding said first technical term;

reviewing a glossary list to determine if said meaning of said analyzed text preceding or succeeding said first technical term in said first document matches a meaning in said glossary list linked to a second technical term, wherein said glossary list comprises a list of meanings associated with equivalent technical terms in designated products;

identifying said second technical term equivalent to said first technical term from said glossary list in response to determining said meaning of said analyzed text preceding or succeeding said first technical term matching said meaning in said glossary list linked to said second technical term; and annotating said first document by replacing said first technical term with said second technical term or tagging said first technical term with said second technical term.

2. The method as recited in claim 1, wherein said meaning of said analyzed text preceding or succeeding said first technical term is deemed to match said meaning in said glossary list linked to said second technical term in response to said meaning of said analyzed text preceding or succeeding said first technical term having a semantic similarity to said meaning in said glossary list linked to said second technical term that exceeds a threshold value.

3. The method as recited in claim 1, wherein said training of said deep learning model to identify equivalent technical terms further comprises:

analyzing text preceding or succeeding said tag annotations of said technical terms to identify a meaning of said analyzed text, wherein said meaning of said analyzed text is determined using part-of-speech tagging using a stochastic part-of-speech tagging algorithm.

4. The method as recited in claim 1, wherein said training of said deep learning model to identify equivalent technical terms further comprises:

analyzing text preceding or succeeding said tag annotations of said technical terms to identify a meaning of said analyzed text, wherein said meaning of said analyzed text is determined using part-of-speech tagging using a rule-based tagging algorithm.

5. The method as recited in claim 1, wherein said training of said deep learning model to identify equivalent technical terms further comprises:

receiving a second document regarding a second product and a third document regarding a third product;

annotating technical terms in text of said second and third documents with tags;

receiving further annotations of technical terms in said text of said second and third documents with tags from a user;

analyzing text preceding or succeeding said tag annotations of said technical terms in said second and third documents to determine a meaning of said text preceding or succeeding said tag annotations of said technical terms in said second and third documents;

identifying a third technical term in said second document with a same meaning as a fourth technical term in said third document; and adding said third and fourth technical terms in said glossary list as being equivalent technical terms;

wherein said third technical term is deemed to have said same meaning as said fourth technical term in response to a meaning of said analyzed text preceding or succeeding said third technical term having a semantic similarity to a meaning of said analyzed text surrounding said fourth technical term that exceeds a threshold value.

6. The method as recited in claim 1, wherein said entity identification engine provides a syntactic breakdown of said text in said first and second documents, identification of entities detected in said text, co-reference resolution, and relationship detection between entities, wherein said entity identification engine provides logic for searching indices augmented with co-referenced terms discovered by said entity identification engine and for generating a relational database that stores entities found by said entity identification engine, an entity type, terms related to said entities, a frequency of a particular relationship within a corpus or across corpora, a time of publication of a document that is a source of said relationship, a corpus identifier, and a document identifier of a document that is said source of said relationship.

7. A computer program product for identifying equivalent technical terms, the computer program product comprising one or more computer readable storage mediums having program code embodied therewith, the program code comprising programming instructions for:

training a deep learning model to identify equivalent technical terms using training data comprising structured and unstructured data comprising documents annotated with technical terms that are identified as being equivalent, wherein said equivalent technical terms correspond to technical terms having a same semantic meaning within a threshold degree, wherein said training of said deep learning model to identify equivalent technical terms comprises:

annotating technical terms in text of a first document regarding a first product and a second document regarding a second product with tags corresponding to matching technical terms listed in a data structure; and annotating said tagged technical terms with entity types using an entity identification engine to assist said deep learning model in identifying equivalent technical terms, wherein said entity identification engine provides components for term or entity detection using maximum entropy models trained from annotated data, wherein said entity identification engine further provides a trainable co-reference component for grouping detected terms in a document that correspond to a same entity, and a trainable relation extraction system;

applying said deep learning model to a first document;

analyzing each sentence of said first document to identify technical terms;

analyzing text preceding or succeeding a first technical term identified in said first document to determine a meaning of said text preceding or succeeding said first technical term;

reviewing a glossary list to determine if said meaning of said analyzed text preceding or succeeding said first technical term in said first document matches a meaning in said glossary list linked to a second technical term, wherein said glossary list comprises a list of meanings associated with equivalent technical terms in designated products;

identifying said second technical term equivalent to said first technical term from said glossary list in response to determining said meaning of said analyzed text preceding or succeeding said first technical term matching said meaning in said glossary list linked to said second technical term; and annotating said first document by replacing said first technical term with said second technical term or tagging said first technical term with said second technical term.

8. The computer program product as recited in claim 7, wherein said meaning of said analyzed text preceding or succeeding said first technical term is deemed to match said meaning in said glossary list linked to said second technical term in response to said meaning of said analyzed text preceding or succeeding said first technical term having a semantic similarity to said meaning in said glossary list linked to said second technical term that exceeds a threshold value.

9. The computer program product as recited in claim 7, wherein said training of said deep learning model to identify equivalent technical terms further comprises the programming instructions for:

analyzing text preceding or succeeding said tag annotations of said technical terms to identify a meaning of said analyzed text, wherein said meaning of said analyzed text is determined using part-of-speech tagging using a stochastic part-of-speech tagging algorithm.

10. The computer program product as recited in claim 7, wherein said training of said deep learning model to identify equivalent technical terms further comprises the programming instructions for:

analyzing text preceding or succeeding said tag annotations of said technical terms to identify a meaning of said analyzed text, wherein said meaning of said analyzed text is determined using part-of-speech tagging using a rule-based tagging algorithm.

11. The computer program product as recited in claim 7, wherein said training of said deep learning model to identify equivalent technical terms further comprises the programming instructions for:

receiving a second document regarding a second product and a third document regarding a third product;

annotating technical terms in text of said second and third documents with tags;

receiving further annotations of technical terms in said text of said second and third documents with tags from a user;

analyzing text preceding or succeeding said tag annotations of said technical terms in said second and third documents to determine a meaning of said text preceding or succeeding said tag annotations of said technical terms in said second and third documents;

identifying a third technical term in said second document with a same meaning as a fourth technical term in said third document; and adding said third and fourth technical terms in said glossary list as being equivalent technical terms;

wherein said third technical term is deemed to have said same meaning as said fourth technical term in response to a meaning of said analyzed text preceding or succeeding said third technical term having a semantic similarity to a meaning of said analyzed text surrounding said fourth technical term that exceeds a threshold value.

12. The computer program product as recited in claim 7, wherein said entity identification engine provides a syntactic breakdown of said text in said first and second documents, identification of entities detected in said text, co-reference resolution, and relationship detection between entities, wherein said entity identification engine provides logic for searching indices augmented with co-referenced terms discovered by said entity identification engine and for generating a relational database that stores entities found by said entity identification engine, an entity type, terms related to said entities, a frequency of a particular relationship within a corpus or across corpora, a time of publication of a document that is a source of said relationship, a corpus identifier, and a document identifier of a document that is said source of said relationship.

13. A system, comprising:

a memory for storing a computer program for identifying equivalent technical terms; and a processor connected to said memory, wherein said processor is configured to execute program instructions of the computer program comprising:

training a deep learning model to identify equivalent technical terms using training data comprising structured and unstructured data comprising documents annotated with technical terms that are identified as being equivalent, wherein said equivalent technical terms correspond to technical terms having a same semantic meaning within a threshold degree, wherein said training of said deep learning model to identify equivalent technical terms comprises:

annotating technical terms in text of a first document regarding a first product and a second document regarding a second product with tags corresponding to matching technical terms listed in a data structure; and annotating said tagged technical terms with entity types using an entity identification engine to assist said deep learning model in identifying equivalent technical terms, wherein said entity identification engine provides components for term or entity detection using maximum entropy models trained from annotated data, wherein said entity identification engine further provides a trainable co-reference component for grouping detected terms in a document that correspond to a same entity, and a trainable relation extraction system;

applying said deep learning model to a first document;

analyzing each sentence of said first document to identify technical terms;

analyzing text preceding or succeeding a first technical term identified in said first document to determine a meaning of said text preceding or succeeding said first technical term;

reviewing a glossary list to determine if said meaning of said analyzed text preceding or succeeding said first technical term in said first document matches a meaning in said glossary list linked to a second technical term, wherein said glossary list comprises a list of meanings associated with equivalent technical terms in designated products;

identifying said second technical term equivalent to said first technical term from said glossary list in response to determining said meaning of said analyzed text preceding or succeeding said first technical term matching said meaning in said glossary list linked to said second technical term; and annotating said first document by replacing said first technical term with said second technical term or tagging said first technical term with said second technical term.

14. The system as recited in claim 13, wherein said meaning of said analyzed text preceding or succeeding said first technical term is deemed to match said meaning in said glossary list linked to said second technical term in response to said meaning of said analyzed text preceding or succeeding said first technical term having a semantic similarity to said meaning in said glossary list linked to said second technical term that exceeds a threshold value.

15. The system as recited in claim 13,
wherein the program instructions of said training of said deep learning model to identify equivalent technical terms further comprises:
analyzing text preceding or succeeding said tag annotations of said technical terms to identify a meaning of said analyzed text, wherein said meaning of said analyzed text is determined using part-of-speech tagging using a stochastic part-of-speech tagging algorithm.

16. The system as recited in claim 13,
wherein the program instructions of said training of said deep learning model to identify equivalent technical terms further comprises:
analyzing text preceding or succeeding said tag annotations of said technical terms to identify a meaning of said analyzed text, wherein said meaning of said analyzed text is determined using part-of-speech tagging using a rule-based tagging algorithm.

17. The system as recited in claim 13, wherein the program instructions of said training of said deep learning model to identify equivalent technical terms further comprises:
receiving a second document regarding a second product and a third document regarding a third product;
annotating technical terms in text of said second and third documents with tags;
receiving further annotations of technical terms in said text of said second and third documents with tags from a user;
analyzing text preceding or succeeding said tag annotations of said technical terms in said second and third documents to determine a meaning of said text preceding or succeeding said tag annotations of said technical terms in said second and third documents;
identifying a third technical term in said second document with a same meaning as a fourth technical term in said third document; and
adding said third and fourth technical terms in said glossary list as being equivalent technical terms;
wherein said third technical term is deemed to have said same meaning as said fourth technical term in response to a meaning of said analyzed text preceding or succeeding said third technical term having a semantic similarity to a meaning of said analyzed text surrounding said fourth technical term that exceeds a threshold value.

* * * * *